US011978567B1

(12) United States Patent
Wearmouth

(10) Patent No.: US 11,978,567 B1
(45) Date of Patent: May 7, 2024

(54) TELESCOPIC LEAD BLANKET LIFTING FRAME

(71) Applicant: Safesmart LLC, Santa Fe Springs, CA (US)

(72) Inventor: Shane Joseph Wearmouth, Los Angeles, CA (US)

(73) Assignee: SAFESMART, LLC, Santa Fe Springs, CA (US)

( * ) Notice: Subject to any disclaimer, the term of this patent is extended or adjusted under 35 U.S.C. 154(b) by 457 days.

(21) Appl. No.: 17/476,549

(22) Filed: Sep. 16, 2021

Related U.S. Application Data

(60) Provisional application No. 63/079,736, filed on Sep. 17, 2020.

(51) Int. Cl.
*G21F 1/08* (2006.01)
*B66F 7/14* (2006.01)
*B66F 7/28* (2006.01)

(52) U.S. Cl.
CPC .................. *G21F 1/08* (2013.01); *B66F 7/14* (2013.01); *B66F 7/28* (2013.01)

(58) Field of Classification Search
CPC ..... G21F 1/00; G21F 1/08; G21F 1/12; G21F 3/00; G21F 3/02; G21F 3/04; B66F 7/14; B66F 7/28; B66F 1/00; B66F 1/06; B66F 11/00
USPC ................................ 250/519.1, 505.1, 515.1
See application file for complete search history.

(56) References Cited

U.S. PATENT DOCUMENTS

| | | | | |
|---|---|---|---|---|
| 4,638,166 A * | 1/1987 | Baudro | G21F 3/04 | 250/517.1 |
| 5,859,438 A * | 1/1999 | Nemezawa | G21F 3/04 | 250/519.1 |
| 2008/0093568 A1* | 4/2008 | Fox | G21F 1/02 | 250/515.1 |
| 2012/0305706 A1* | 12/2012 | Weston | B64C 1/40 | 296/181.6 |
| 2021/0280333 A1* | 9/2021 | Marsh | G21F 7/045 | |

* cited by examiner

*Primary Examiner* — Jason L McCormack
(74) *Attorney, Agent, or Firm* — Luedeka Neely, P.C.

(57) ABSTRACT

A telescopic lead blanket lifting frame and method for shielding workers from a radiation source. The lifting frame includes, first and second hollow vertical tubular members attached orthogonally on first ends thereof to first and second ends of a horizontal base member. Third and fourth vertical tubular members and slidably disposed in the first and second hollow vertical tubular members. A first cross member is attached orthogonally to second ends of the first and second hollow vertical tubular members. A second cross member is attached orthogonally to distal ends of the third and fourth vertical tubular members. A plurality of hooks are attached to the first and second cross members on side portions thereof for engaging lead blankets. A lifting gear is provided for telescopically extending and retracting the third and fourth vertical tubular members and second cross member in a vertical direction.

15 Claims, 12 Drawing Sheets

TELESCOPIC LEAD BLANKET LIFTING FRAME

RELATED APPLICATION

This application claims priority to provisional application Ser. No. 63/079,736, filed Sep. 17, 2020.

TECHNICAL FIELD

The disclosure is directed to portable lead blanket shields for the nuclear power industry and in particular to a telescopic lead blanking lifting frame for forming lead blanket shields for workers.

BACKGROUND AND SUMMARY

Lead blankets weigh 40 to 60 pounds each and are difficult to lift and maneuver into position for forming protective lead shields for workers in the nuclear power generation industry and other industries that have potential radiation exposure to workers. As the workforce gets older, it is more difficult and dangerous to lift the heavy lead blanks into place to form a lead shield. Accordingly, what is needed is a lead blanket lifting device that reduces the need to lift lead blankets overhead by hand thereby reducing the incidence of injury to workers.

In view of the foregoing, an embodiment of the disclosure provides a telescopic lead blanket lifting frame. The lifting frame includes a first hollow vertical tubular member attached orthogonally on a first end thereof to a first end of a horizontal base member, a second hollow vertical tubular member attached orthogonally on a first end thereof to a second end of the horizontal base member, a third vertical tubular member slidably disposed in the first hollow vertical tubular member, a fourth vertical tubular member slidably disposed in the second hollow vertical tubular member, a first cross member attached orthogonally to a second end of the first hollow vertical tubular member and to a second end of the second hollow vertical tubular member, a second cross member attached orthogonally to a distal end of the third vertical tubular member and to a distal end of the fourth vertical tubular member, a plurality of hooks attached to the first cross member and to the second cross member on side portions thereof for engaging lead blankets, and a lifting gear for telescopically extending and retracting the third and fourth vertical tubular members and second cross member in a vertical direction.

In another embodiment there is provided a method for shielding workers from radiation. The method includes providing a telescopic lead blanket lifting frame including, a first hollow vertical tubular member attached orthogonally on a first end thereof to a first end of a horizontal base member, a second hollow vertical tubular member attached orthogonally on a first end thereof to a second end of the horizontal base member, a third vertical tubular member slidably disposed in the first hollow vertical tubular member, a fourth vertical tubular member slidably disposed in the second hollow vertical tubular member, a first cross member attached orthogonally to a second end of the first hollow vertical tubular member and to a second end of the second hollow vertical tubular member, a second cross member attached orthogonally to a distal end of the third vertical tubular member and to a distal end of the fourth vertical tubular member, a plurality of hooks attached to the first cross member and to the second cross member on side portions thereof for engaging lead blankets, and a lifting gear for telescopically extending and retracting the third and fourth vertical tubular members and second cross member in a vertical direction. A plurality of lead blankets are attached to the plurality of hooks on the first and second cross members. The lifting gear is actuated to lift the second cross member to desired height above the first cross member. One or more of the lead blanket lifting frames are positioned between the workers and the radiation source.

In some embodiments, the horizontal base member includes a rectangular frame having four wheels attached adjacent to corners of the rectangular frame.

In some embodiments, the horizontal base member further includes a pair of wheels on opposing ends thereof and adjustable stabilizer feet on the opposing ends thereof.

In some embodiments, the lifting gear comprises a central vertical screw gear disposed between the first cross member and the second cross member to vertically move the second cross member toward and away from the first cross member.

In some embodiments, the lifting gear comprises pinion gears disposed adjacent the first and second hollow vertical tubular members and racks attached to the third and fourth vertical tubular members. In other embodiments, the lifting gear comprises a first gear box disposed on the second end of the first hollow vertical tubular member and a second gear box disposed on the second end of the second hollow vertical tubular member, wherein a worm gear axle is disposed through the first cross member to activate the first gear box and the second gear box to extend and retract the third and fourth vertical tubular members and the second cross member in the vertical direction upon rotation of the worm gear axle.

In some embodiments, the lifting gear is manually actuated. In other embodiments, the lifting gear is actuated by a motor.

In some embodiments, one or more rosette scaffolding discs are disposed on each of the first hollow vertical tubular member and second hollow tubular member and one or more stabilizer outriggers are attached to the one or more rosette scaffolding discs. In other embodiments, the horizontal base member and the stabilizer outriggers have locking wheels.

In some embodiments, a coupling is provided for connecting multiple telescopic lead blanket lifting frames to one another.

In some embodiments, the plurality of hooks include spring loaded metal hooks.

DETAILED DESCRIPTION OF EXEMPLARY EMBODIMENTS

Figure 1:
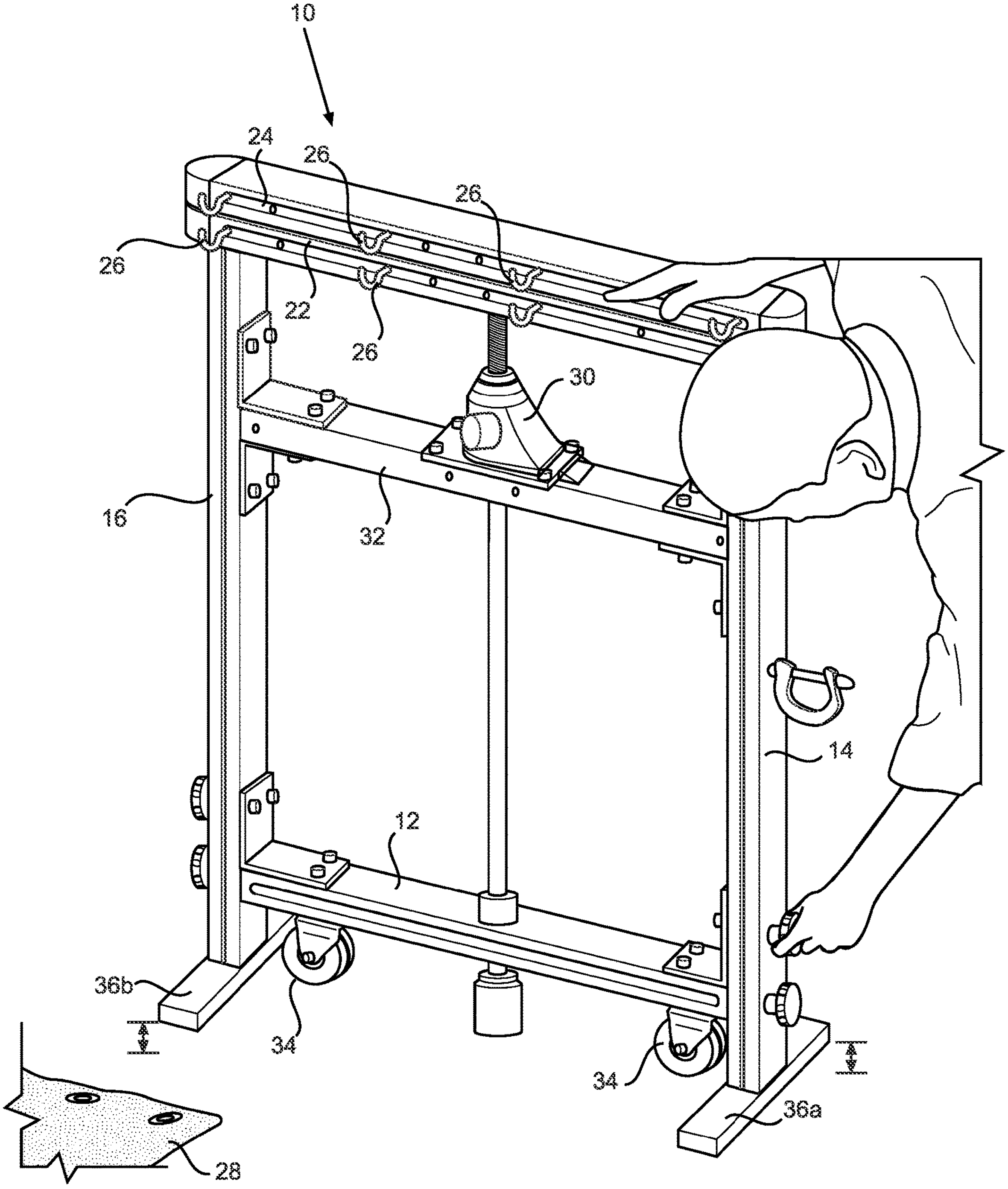
FIG. 1 is a perspective view of a telescopic lead blanket lifting frame according to a first embodiment of the disclosure.

With reference to FIGS. 1-7, there is illustrated a telescopic lead blanket lifting frame 10 that includes a horizontal base member 12, first and second vertical hollow tubular members 14 and 16 attached to opposing ends of the horizontal base member 12, third and fourth vertical tubular members 18 and 20 slidably disposed in the first and second vertical hollow tubular members 14 and 16 respectively, a first cross member 22 attached to distal ends of the first and second vertical hollow tubular members 14 and 16, and a second cross member 24 attached to distal ends of the third and fourth vertical tubular members 18 and 20. Each of the first and second cross members 22 and 24 include a plurality of hooks 26 for disposing lead blankets 28 thereon. A lifting gear 30 is provided for telescopically extending and retracting the third and fourth vertical tubular members 18 and 20 and second cross member 24 in a vertical direction. When the lifting gear 30 is a screw type lifting gear a third cross member 32 is provided below the first cross member 22 and is attached to the first and second vertical hollow tubular members 14 and 16 for supporting the screw type lifting gear housing.

Figure 2:
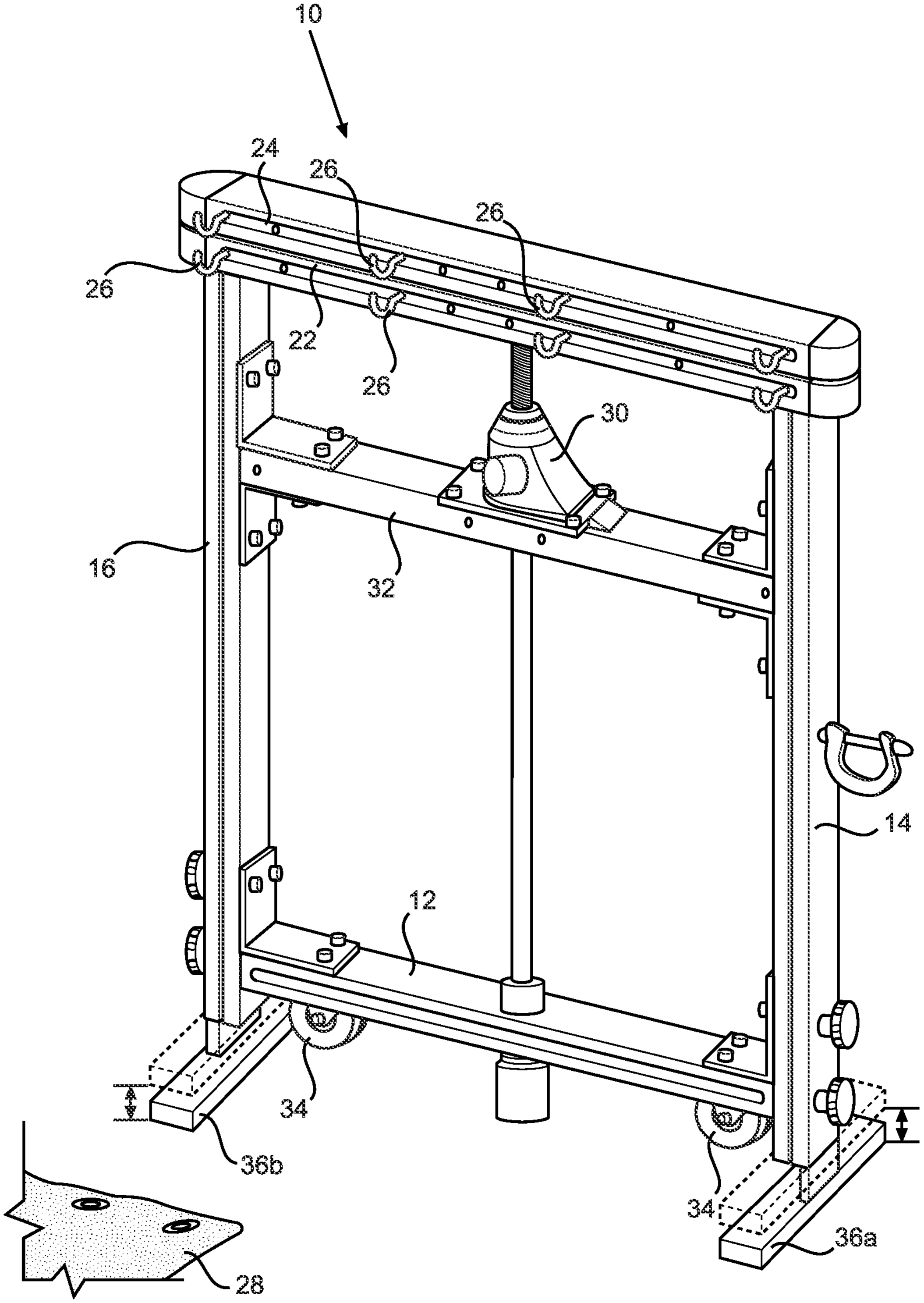
FIG. 2 is a perspective view of the telescopic lead blanket lifting frame of FIG. 1 with an adjustable stabilizer foot in a stabilizer position.

The lifting frame 10 preferably includes wheels 34 for moving the lifting frame 10 into position for shielding workers from radiation. Once the lifting frame 10 is in the shielding position, stabilizing feet 36 attached to opposing ends of the horizontal base member 12 may be lowered to ground level to prevent the frame 10 from moving or tilting as the lead blankets 28 are lifted. In FIG. 1, the stabilizing feet 36*a* and 36*b* are in a raised position for moving the lifting frame. In FIG. 2 the stabilizing feet 36*a* and 36*b* are in a lowered position adjacent a ground. In some embodiments the lead blankets 28 weigh 40 to 60 pounds. FIGS. 3-7 illustrate a frame containing 45 pound lead blankets.

Figure 3:
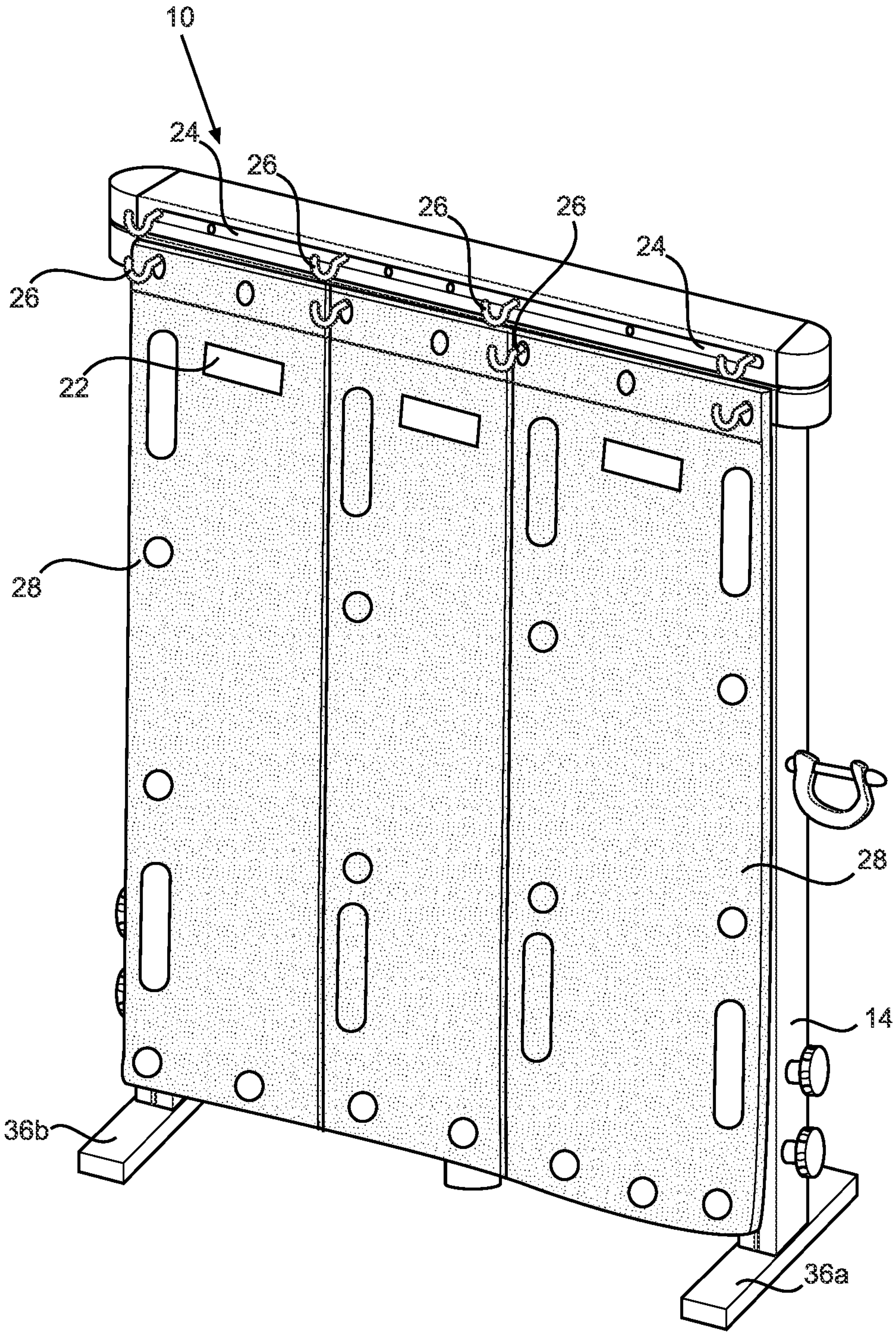
FIG. 3 is a perspective view of the telescopic lead blanket lifting frame of FIG. 1 with lead blankets attached to hooks on a first cross member.
Figure 4:
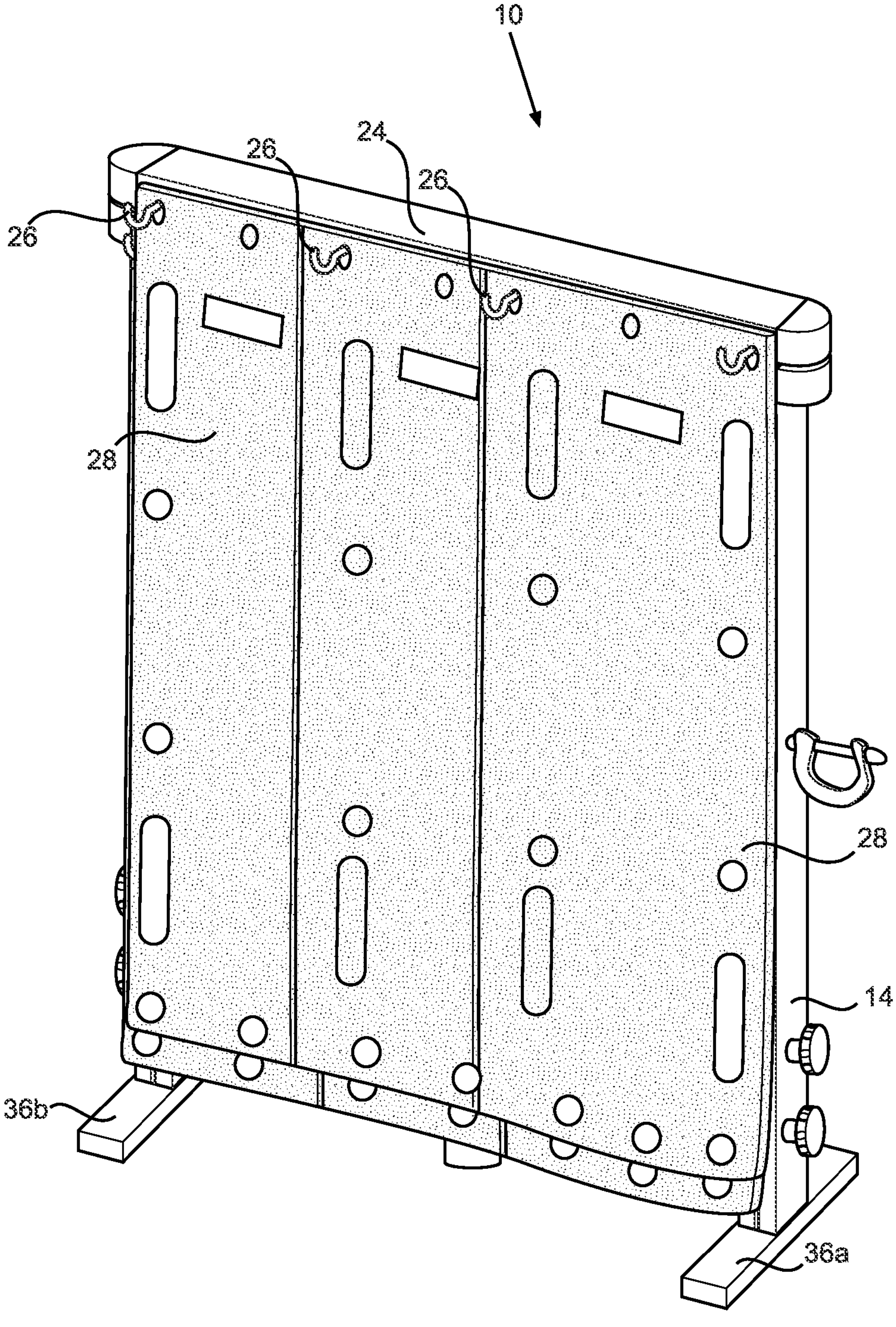
FIG. 4 is a perspective view of the telescopic lead blanket lifting frame of FIG. 1 with lead blankets attached to hooks on a first cross member and a second cross member.

Prior to actuating the lifting gear 30, lead blankets 28 are disposed on the hooks 26 on the first cross member 22 as show in FIG. 3 and on hooks on the second cross member 24 as shown in FIG. 4.

Figure 5:
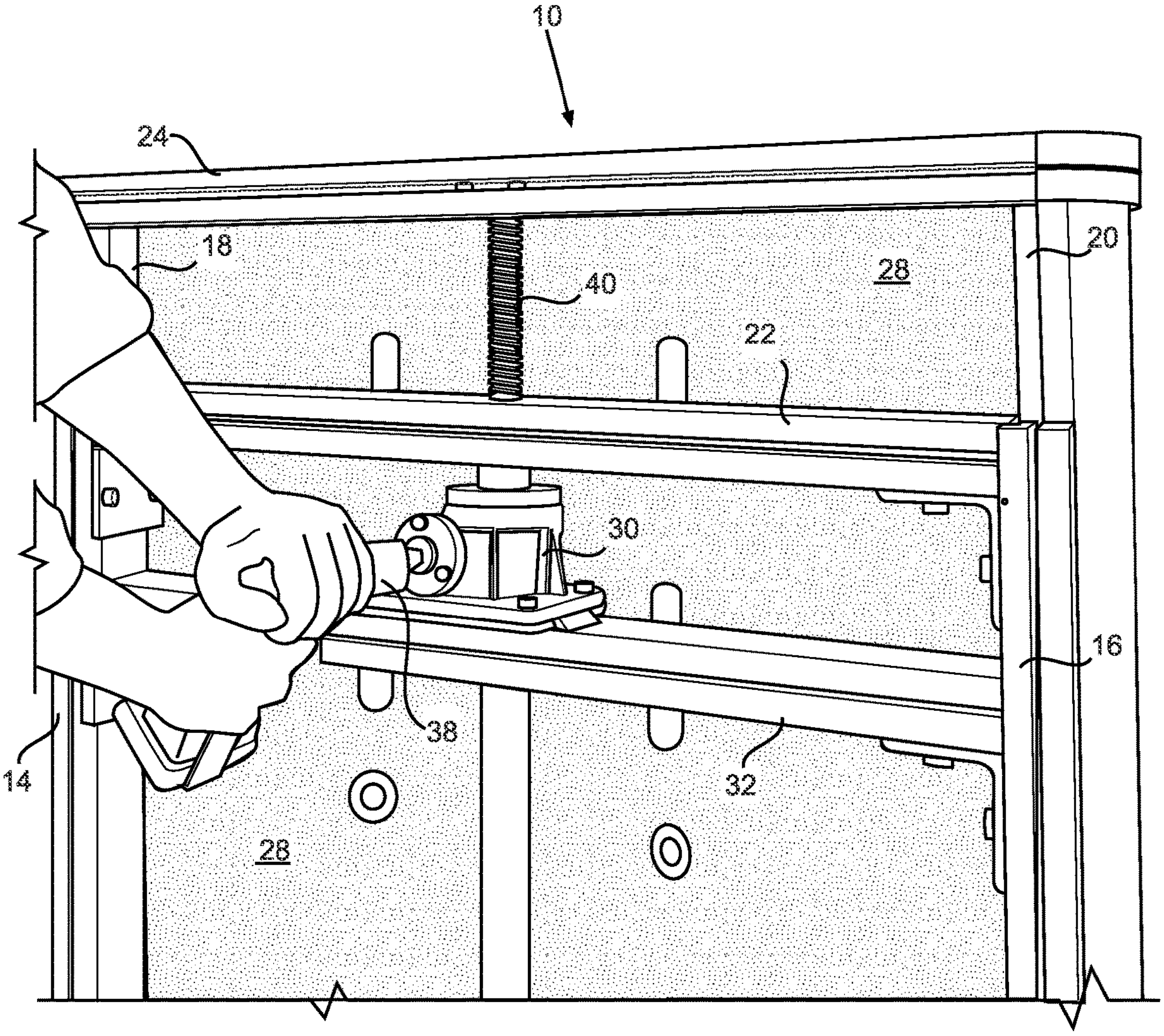
FIG. 5 is a partial rear perspective view of the telescopic lead blanket lifting frame of FIG. 1 with a lifting gear being actuated.
Figure 6:
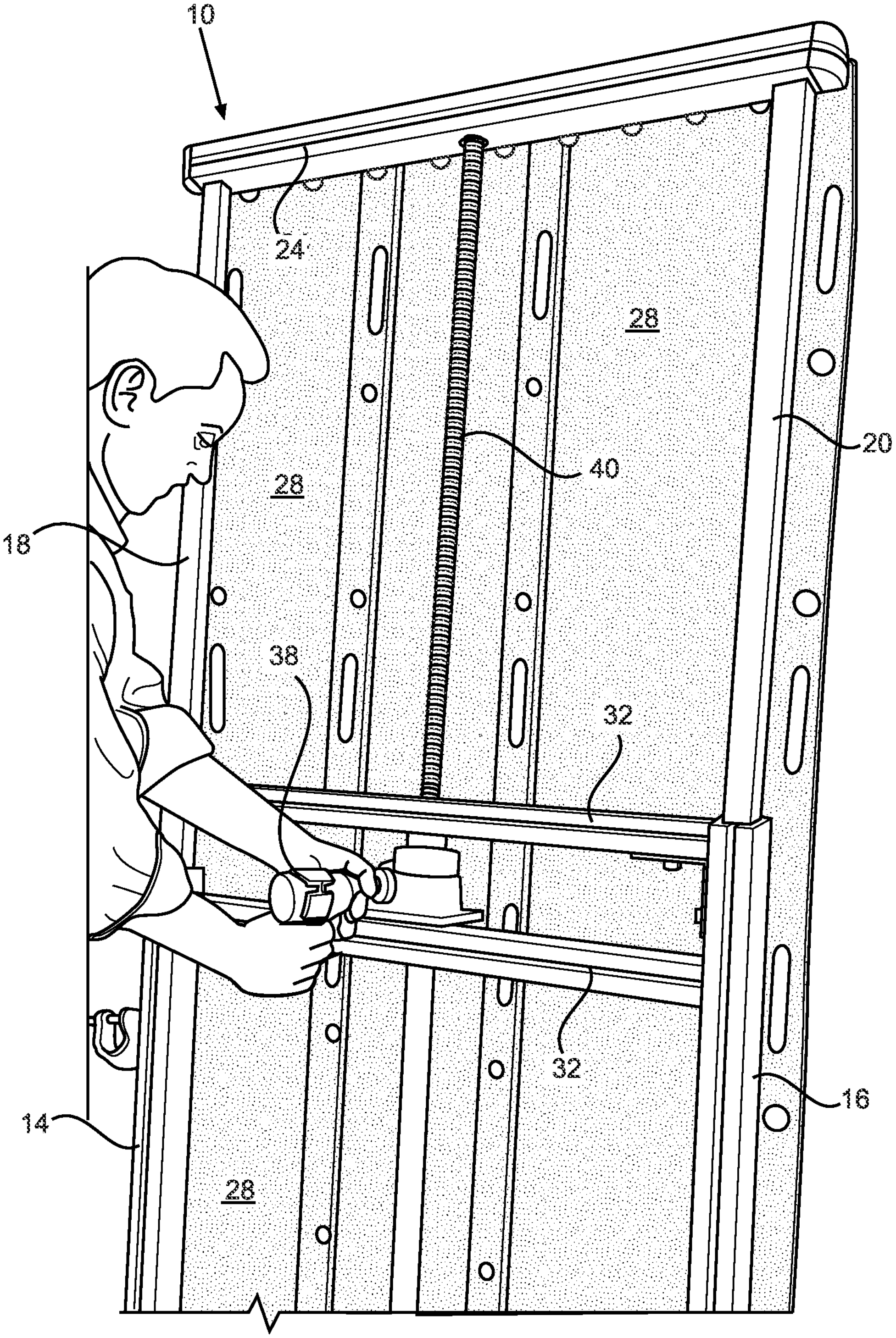
FIG. 6 is a partial rear perspective view of the telescopic lead blanket lifting frame of FIG. 1 in a fully extended frame position.

In FIG. 5, the second cross member 24 is being raised by activating the lifting gear 30 either by a hand crank, electric motor, or as shown in FIG. 5, by a hand-held drill 38. As the lifting gear 30 is actuated a lifting screw 40 raises the second cross member 24 as the third and fourth vertical tubular members 18 and 20 slide within a hollow channel of the first and second vertical hollow tubular members 14 and 16. FIG. 6 is a rear view of the lifting frame 10 showing the second cross member 24 in the totally extended position. Cross member 24 may be lowered by reversing the hand-held drill 38.

Figure 7:
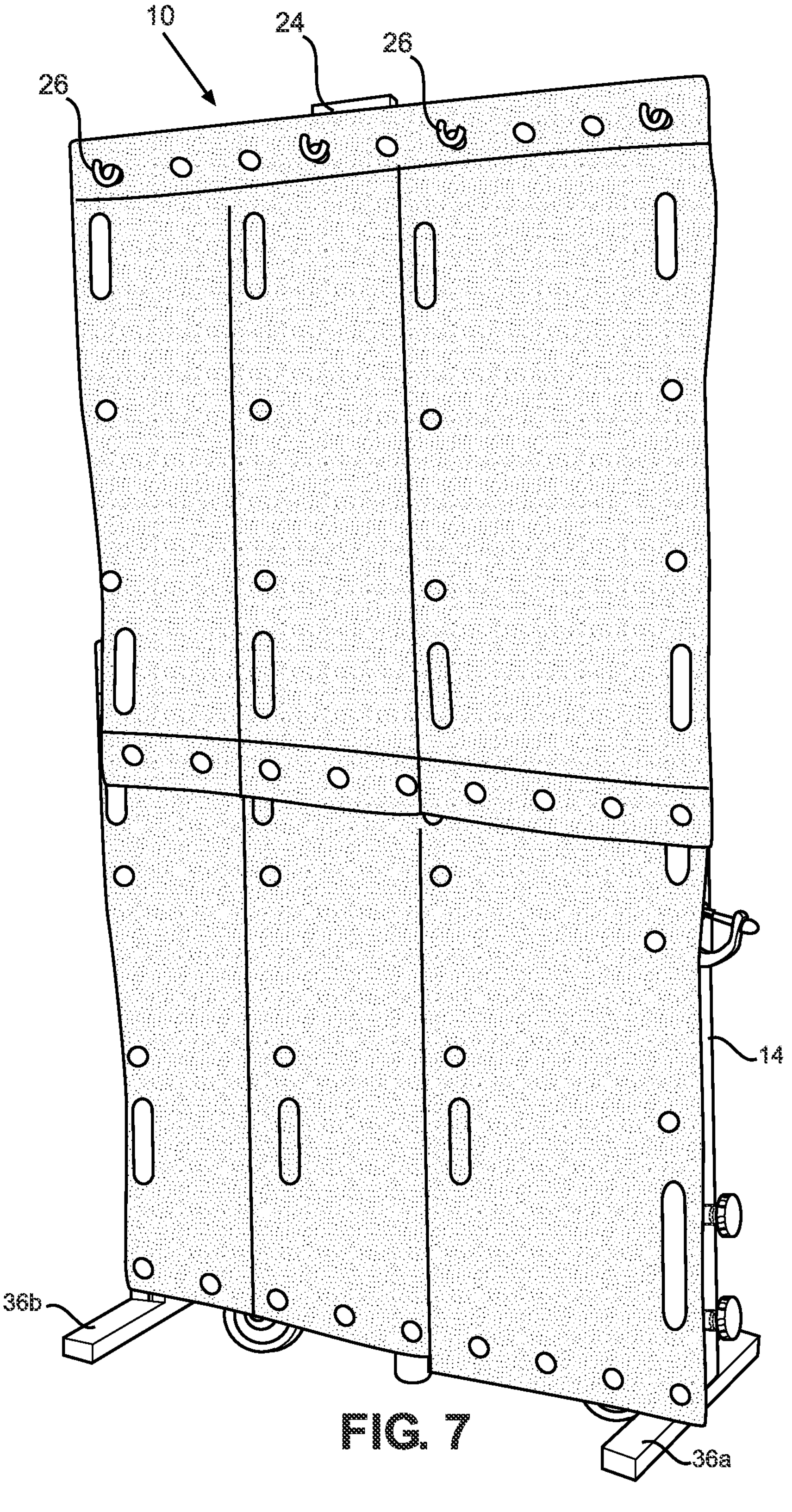
FIG. 7 is a front perspective view of the telescopic lead blanket lifting frame of FIG. 1 in a fully extended frame position.

FIG. 7 is a front view of the lifting frame 10 with six lead blankets 28 attached to the hooks 26 on first and second cross members 22 and 24. Multiple lifting frames 10 containing lead blankets 28 may be positioned side by side to produce a wide lead shield for workers.

Figure 8:
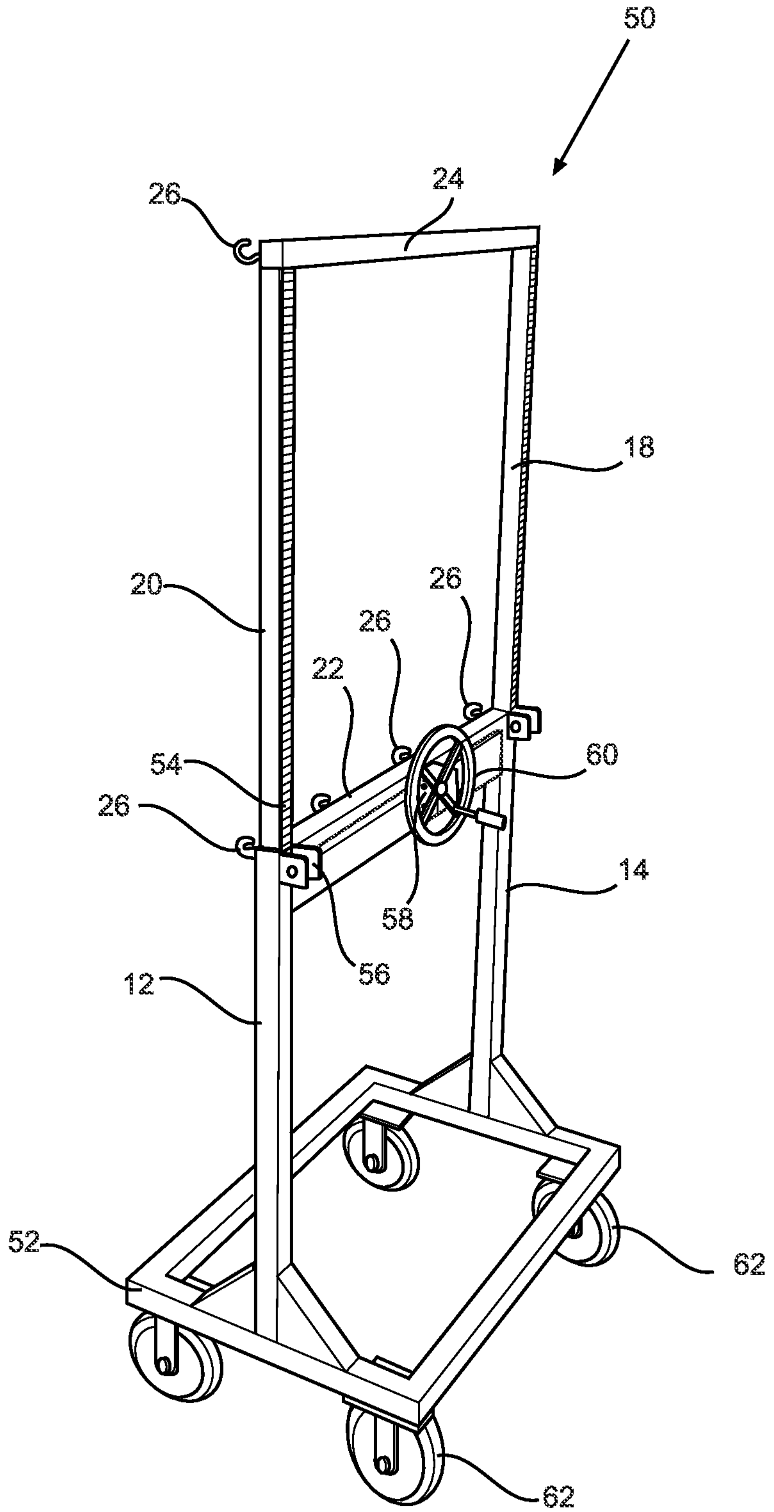
FIG. 8 is a perspective view of a telescopic lead blanket lifting frame according to a second embodiment of the disclosure.

FIG. 8 illustrates an alternative embodiment of a telescopic lead blanket lifting frame 50 according to another embodiment of the disclosure. In this embodiment, the first and second vertical hollow tubular members 12 and 14 are attached on one end to a rectangular base member 52 that is supported by four wheels 62 for stability. Each of the third and fourth vertical tubular members contains a rack 54 for engagement by a pinion 56 that is rotated by a worm gear 58 to raise and lower the second cross member 24 once the lead blankets 28 have been attached to hooks 26 on the first and second cross members 22 and 24. In FIG. 8, a hand crank 60 is illustrated, however, as in the first embodiment, a motor or hand-held drill may be used to raise and lower the second cross member 24.

Figure 9:
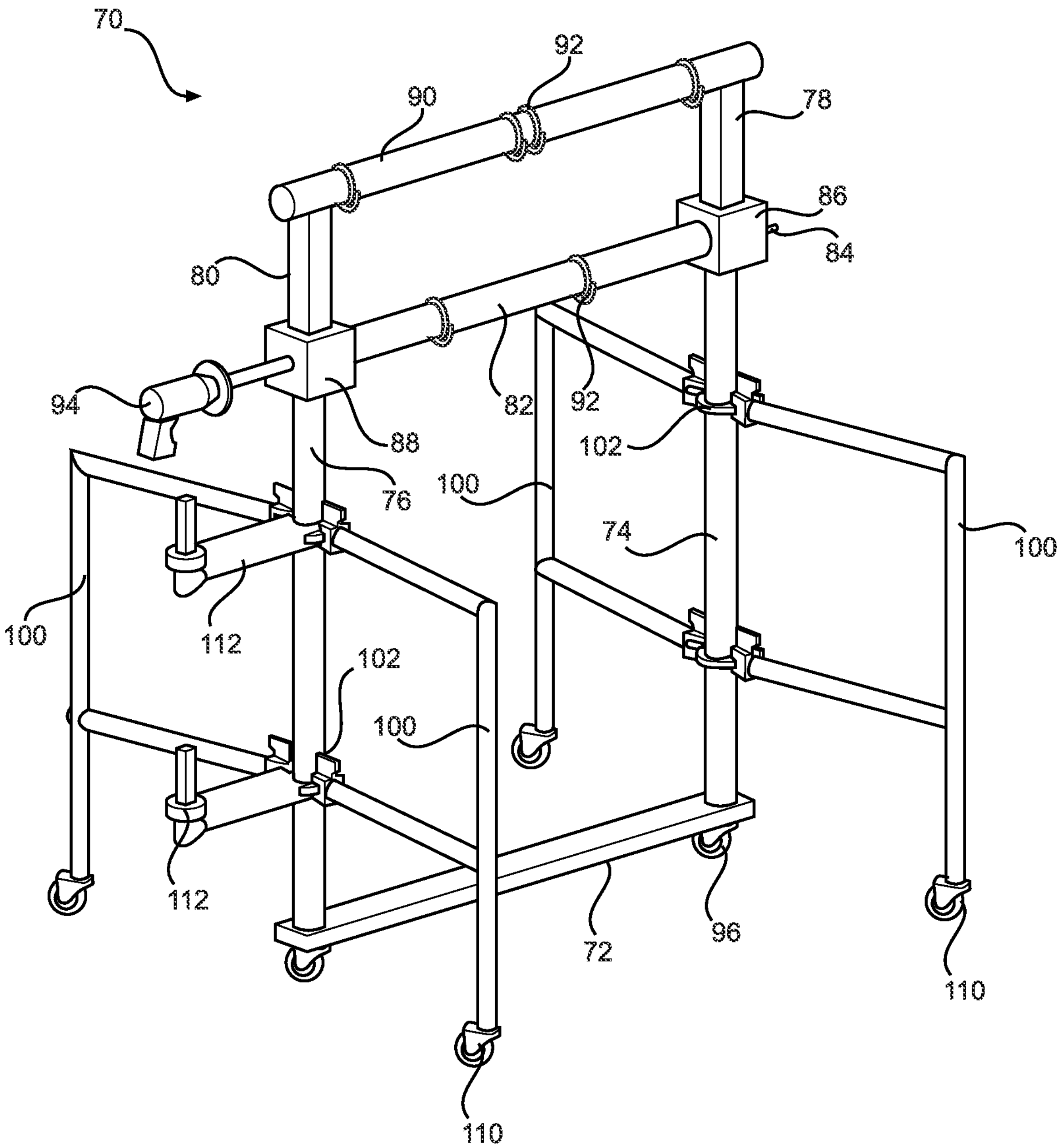
FIGS. 9-10 are perspective views, not to scale, of a lead blanket lifting frame according to another embodiment of the disclosure.
Figure 10:
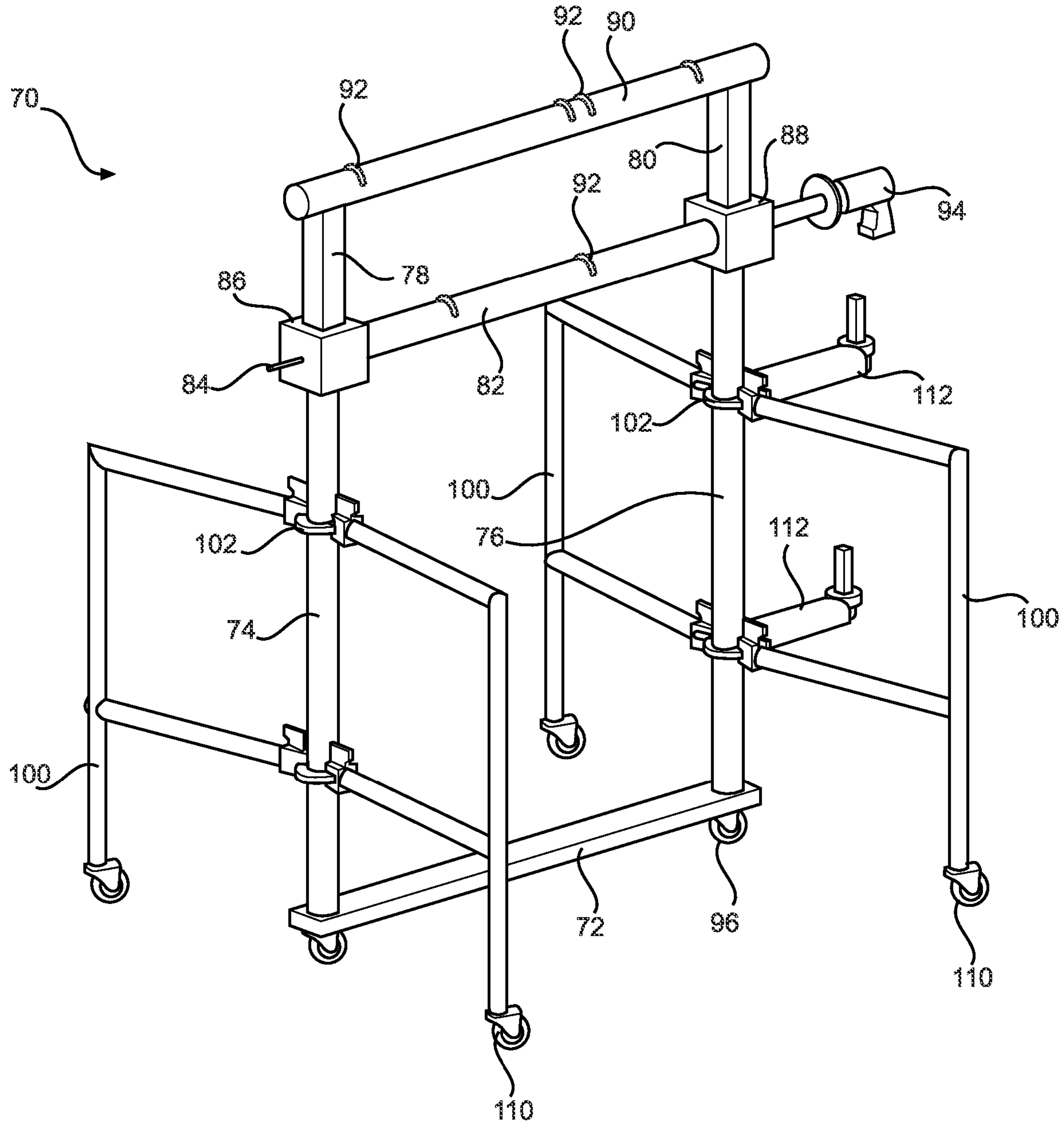

FIGS. 9 and 10 illustrate an alternative embodiment of the disclosure wherein the telescopic lead blanket lifting frame 70 is adapted to be used with conventional scaffolding used in the nuclear industry. The telescopic lead blanket lifting frame 70 that includes a horizontal base member 72, first and second vertical hollow tubular members 74 and 76 attached to opposing ends of the horizontal base member 72, third and fourth vertical tubular members 78 and 80 slidably disposed in the first and second hollow tubular members 74 and 76 respectively, a first hollow cross member 82 containing axle 84 therethrough for activating worm gears in gear boxes 86 and 88 attached to distal ends of the first and second vertical hollow tubular members 74 and 76, and a second cross member 90 attached to distal ends of the third and fourth vertical tubular members 78 and 80. The third and fourth vertical tubular members 78 and 80 may each include a rack for engaging a pinion in the gear boxes 86 and 88 that is rotated by the axle 84 and worm gears. Each of the first and second cross members 82 and 90 include a plurality of spring loaded hooks 92 for disposing lead blankets 28 thereon. The spring loaded hooks 92 are repositionable on each of the first and second cross members 82 and 90 in order to accommodate different size lead blankets. Distal ends of the axle 84 contain a lifting gear for telescopically extending and retracting the third and fourth vertical tubular members 78 and 80 and second cross member 90 in a vertical direction. As above, a hand crank, or as shown a drill 94 may be used to rotate the axle 84 to raise and lower the second cross member 90. The lifting frame 70 preferably includes wheels 96 for moving the lifting frame 70 into position for shielding workers from radiation.

Unlike the previous embodiments, the telescopic lead blanket lifting frame 70 of this embodiment includes outriggers 100 that may be adjustably positioned on the first and second hollow tubular members 74 and 76 by attachment to two or more rosette scaffolding discs 102 (FIG. 11) disposed on each of the first and second hollow tubular members 74 and 76 as shown. FIG. 12 provides a detail view of the outrigger 100. Each outrigger 100 includes a vertical member 104 and two spaced-apart horizontal tubular members 106 attached to the vertical tubular member 104. Each of the horizontal tubular members 106 terminates in a wedge connector 108 for positionally connecting to the rosette scaffolding discs 102 on the first and second hollow tubular members 74 and 76. Accordingly, two or more outriggers

Figure 11:
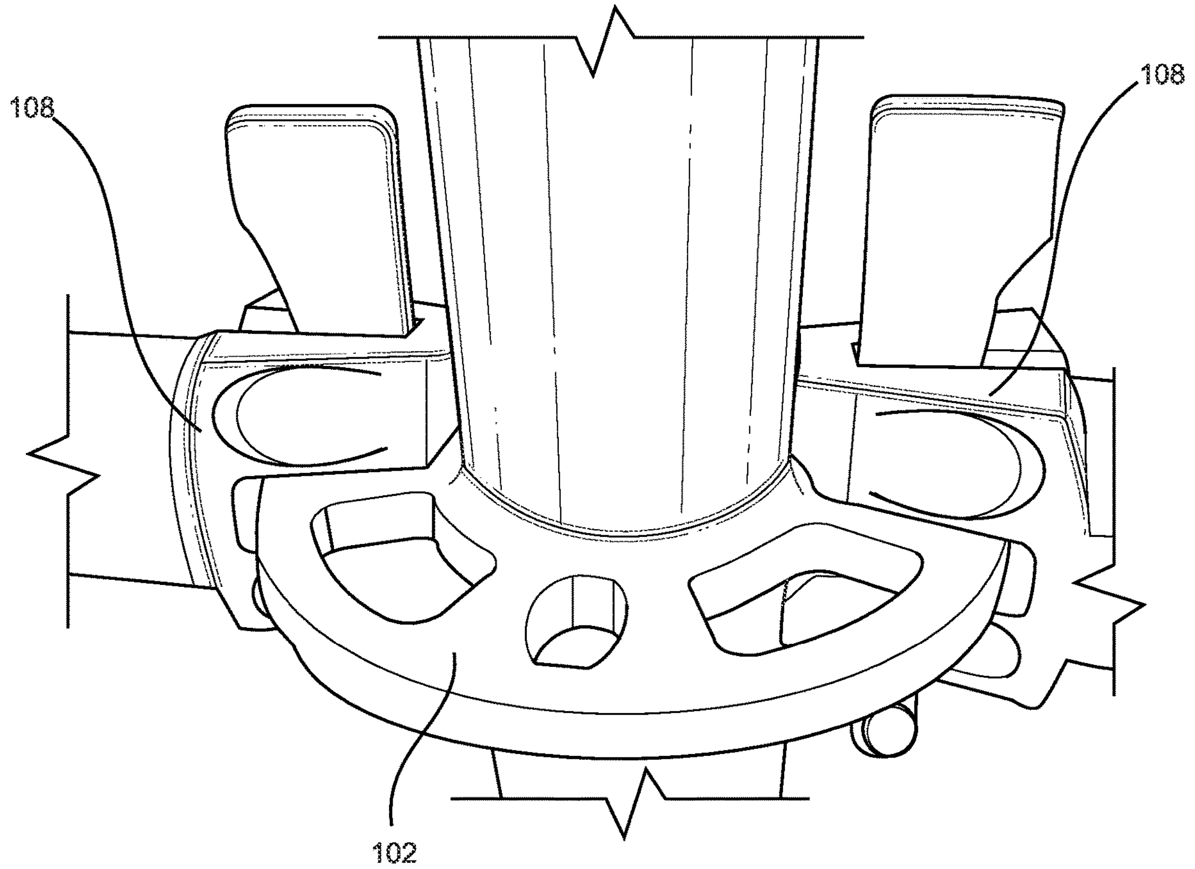
FIG. 11 is a perspective view, not to scale of a rosette scaffolding disc for use with the lead blanking lifting frame of FIGS. 9-10.
Figure 12:
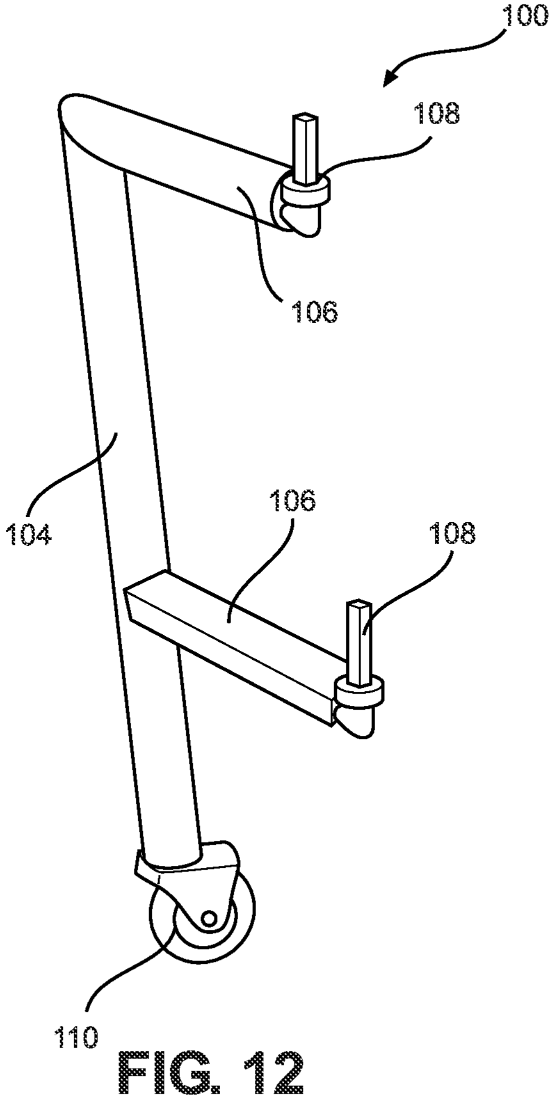
FIG. 12 is a perspective view, not to scale, of an outrigger for use with the lead blanket lifting frame of FIGS. 9-10.
Figure 13:
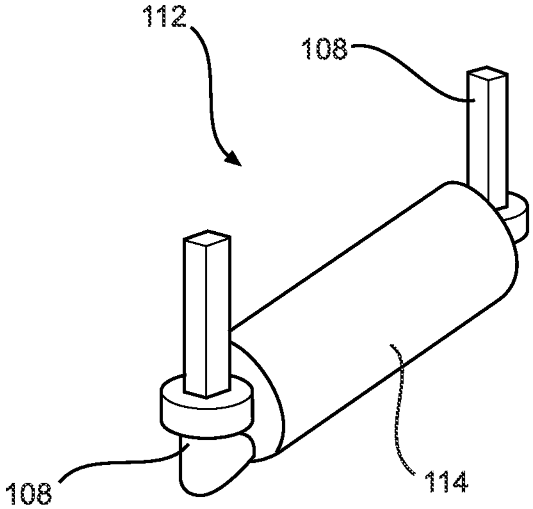
FIG. 13 is a perspective view, not to scale, of a double wedge head joiner for use with the lead blanket lifting frame and rosette scaffolding disc of FIGS. 9-11.

100 may be positioned on the telescopic lifting frame 70 as shown in FIGS. 10-11 to increase the stability of the lifting frame when the lead blankets are attached as described with reference to FIG. 4. For ease of positioning the lead blanket lifting frame 70, each of the outriggers 100 may include a locking wheel 110 as shown.

In some embodiments as described above, a double wedge head joiner 112 containing a pair of wedge head connectors 108 may be used to attach multiple lead blanket lifting frames to one another to provide a wall of lead blankets as described above. The double wedge head joiner 112 may include a spacer 114 between the wedge head connectors 108 that may space-apart the wedge head connectors 108 by from about 4 to about 8 inches so as to avoid interference between adjacent wheels 96, and adjacent outriggers 100 and outrigger wheels 110. Multiple double wedge head joiners 112 may be used with the rosette scaffolding discs 102 on each end of first and second vertical hollow tubular members 74 and 76 of the lead blanket lifting frame 70 (FIG. 9).

While particular embodiments have been described, alternatives, modifications, variations, improvements, and substantial equivalents that are or can be presently unforeseen can arise to applicants or others skilled in the art. Accordingly, the appended claims as filed and as they can be amended are intended to embrace all such alternatives, modifications variations, improvements, and substantial equivalents.

What is claimed is:

1. A telescopic lead blanket lifting frame comprising,
- a first hollow vertical tubular member attached orthogonally on a first end thereof to a first end of a horizontal base member,
- a second hollow vertical tubular member attached orthogonally on a first end thereof to a second end of the horizontal base member,
- one or more rosette scaffolding discs disposed on each of the first hollow vertical tubular member and on the second hollow tubular member,
- a coupling configured for connecting multiple telescopic lead blanket lifting frames to one another using the one or more rosette scaffolding discs,
- a third vertical tubular member slidably disposed in the first hollow vertical tubular member,
- a fourth vertical tubular member slidably disposed in the second hollow vertical tubular member,
- a first cross member attached orthogonally to a second end of the first hollow vertical tubular member and to a second end of the second hollow vertical tubular member,
- a second cross member attached orthogonally to a distal end of the third vertical tubular member and to a distal end of the fourth vertical tubular member,
- a plurality of hooks attached to the first cross member and to the second cross member on side portions thereof configured for engaging lead blankets, and
- a lifting gear configured for telescopically extending and retracting the third and fourth vertical tubular members and second cross member in a vertical direction.

2. The telescopic lead blanket lifting frame of claim 1, wherein the horizontal base member comprises a rectangular frame having four wheels attached adjacent to corners of the rectangular frame.

3. The telescopic lead blanket lifting frame of claim 1, wherein the horizontal base member further comprises a pair of wheels on opposing ends thereof and adjustable stabilizer feet on the opposing ends thereof.

4. The telescopic lead blanket lifting frame of claim 1, wherein the lifting gear comprises a central vertical screw gear disposed between the first cross member and the second cross member configured to vertically move the second cross member toward and away from the first cross member.

5. The telescopic lead blanket lifting frame of claim 1, wherein the lifting gear comprises a first gear box disposed on the second end of the first hollow vertical tubular member and a second gear box disposed on the second end of the second hollow vertical tubular member, wherein a worm gear axle is disposed through the first cross member to activate the first gear box and the second gear box to extend and retract the third and fourth vertical tubular members and the second cross member in the vertical direction upon rotation of the worm gear axle.

6. The telescopic lead blanket lifting frame of claim 1, wherein the lifting gear comprises pinion gears disposed adjacent to the first and second hollow vertical tubular members and racks attached to the third and fourth vertical tubular members.

7. The telescopic lead blanket lifting frame of claim 1, wherein the lifting gear is manually actuated.

8. The telescopic lead blanket lifting frame of claim 1, wherein the lifting gear is actuated by a motor.

9. The telescopic lead blanket lifting frame of claim 1, wherein one or more stabilizer outriggers are attached to the one or more rosette scaffolding discs.

10. The telescopic lead blanket lifting frame of claim 9, wherein the horizontal base member and the stabilizer outriggers comprise locking wheels.

11. The telescopic lead blanket lifting frame of claim 1, wherein the plurality of hooks comprise spring loaded metal hooks.

12. A method for shielding workers from a radiation source, comprising:
- providing a telescopic lead blanket lifting frame including,
  - a first hollow vertical tubular member attached orthogonally on a first end thereof to a first end of a horizontal base member,
  - a second hollow vertical tubular member attached orthogonally on a first end thereof to a second end of the horizontal base member,
  - one or more rosette scaffolding discs disposed on each of the first hollow vertical tubular member and on the second hollow tubular member,
  - a coupling configured for connecting multiple telescopic lead blanket lifting frames to one another using the one or more rosette scaffolding discs,
  - a third vertical tubular member slidably disposed in the first hollow vertical tubular member,
  - a fourth vertical tubular member slidably disposed in the second hollow vertical tubular member,
  - a first cross member attached orthogonally to a second end of the first hollow vertical tubular member and to a second end of the second hollow vertical tubular member,
  - a second cross member attached orthogonally to a distal end of the third vertical tubular member and to a distal end of the fourth vertical tubular member,
  - a plurality of hooks attached to the first cross member and to the second cross member on side portions thereof for engaging lead blankets, and
  - a lifting gear configured for telescopically extending and retracting the third and fourth vertical tubular members and second cross member in a vertical direction, attaching a plurality of lead blankets to the plurality of hooks on the first and second cross members, activating the lifting gear to lift the second cross member to desired height above the first cross member, and positioning one or more of the lead blanket lifting frames between the workers and the radiation source.

13. The method of claim 12, wherein one or more stabilizer outriggers are attached to the one or more rosette scaffolding discs, further comprising positioning the stabilizer outriggers to improve the stability of the lead blanket lifting frame.

14. The method of claim 13, further comprising connecting two or more telescopic lead blanket lifting frames to one another using the coupling and the rosette scaffolding discs.

15. The method of claim 13, wherein the plurality of hooks comprise spring loaded metal hooks, further comprising positioning the spring loaded hooks on the first cross member and second cross member to engage lifting rings on the lead blankets.

* * * * *